United States Patent Office 3,518,124
Patented June 30, 1970

3,518,124
METHOD OF FORMING THE ELECTRODES IN A LOW MAINTENANCE STORAGE BATTERY
Joseph C. Duddy, Trevose, Pa., assignor to ESB Incorporated, a corporation of Delaware
No Drawing. Filed Sept. 6, 1968, Ser. No. 758,137
Int. Cl. H01m 39/00
U.S. Cl. 136—27                                2 Claims

ABSTRACT OF THE DISCLOSURE

A high polymer, water soluble thermoplastic film is interposed between the positive and negative electrodes of a lead acid battery and acts as a temporary colloidal trap for antimony which is released from the lead-antimony grid of the positive electrode primarily during initial charging of the battery. Preferably, the film is on the side of the battery separator facing the negative electrode. However, the film merely has to be interposed between the electrodes and could be placed on the positive electrode or the negative electrode.

In practice, the film is a homopolymer of polyethylene oxide which tends to precipitate in low pH acids to form a gel. The gel easily disperses and essentially disappears into solution upon agitation. Therefore, when a separator having this film on one side is placed in the electrolyte of a lead acid battery, the film turns to a gel and during charging of the battery the gel particles trap antimony moving from the positive to the negative electrode. As the charging continues and gassing commences, the gel disperses under the scrubbing action of the gas stream permitting the trapped antimony to reach the substantially fully charged negative electrode where it combines with hydrogen gas and is dissipated as stibine.

BACKGROUND OF THE INVENTION

In making grids for electrodes in lead acid batteries it is common to use an alloy of lead and antimony. The antimony stiffens the grid so that an electrode of sufficient strength can be made. A problem associated with this lead antimony alloy is the fact that when a grid corrodes the antimony has a tendency to be set free and to deposit on the negative electrode during charging of the battery. When the antimony deposits on the negative electrode, it causes a local action to take place resulting in the formation of lead sulphate on the negative electrode and it lowers the hydrogen overvoltage of that electrode. As a result, the maximum voltage to which the negative electrode, and hence the battery can be charged is lowered. In addition, since the antimony lowers the hydrogen overvoltage of the negative electrode, an instability is introduced whereby after the battery is charged and is stored with electrolyte therein the electrode slowly self-discharges so that the capacity of the battery decreases. Therefore, if the charged battery is to be stored, it must be stored in a dry condition.

Over the years, a great variety of separators have been used to separate electrodes of opposite polarities in batteries and thereby prevent short circuits to occur between such electrodes. Some of the conventional separators are made from materials such as wood, rubber, microporous plastics, fibrous materials impregnated with insoluble resins, to name but a few. While these separators have performed their main purposes, none of them have been able to prevent antimony from moving from the positive electrode and depositing on the negative electrode during charging of the battery.

SUMMARY OF THE INVENTION

It is therefore an object of the invention to provide a method for the first charge of a lead acid battery wherein antimony is prevented from depositing on the negative electrode. In acomplishing this main purpose, it is the object of the invention to trap antimony flowing from the positive electrode to the negative electrode during the initial charging of a lead acid battery until such time as the negative electrode has been charged to a voltage sufficiently high to permit the negative electrode to drive the antimony off in the form of stibine gas. It is a further object to provide a colloidal trap for the antimony in the form of a gel of a homopolymer of polyethylene oxide.

It is another purpose of this invention to increase the shelf life of a wet lead acid storage battery by inhibiting self-discharge of the battery while on open stand. This object is achieved by this invention which prevents the hydrogen overvoltage of the negative electrode from being lowered as the result of antimony depositing on the electrode during initial charging.

It is an additional object of this invention to provide a method of making a low maintenance lead acid battery wherein during formation of the positive and negative electrodes of said battery antimony from the alloy grid of the positive electrode is prevented from depositing on the negative electrode.

It is a further object of the invention to have a method of retaining the high overvoltage of the negative electrode of a lead acid battery during formation of this electrode.

It is a further object to provide a lead acid battery which in its initial state has been charged to a higher potential than conventional batteries. This object is achieved by the method of this invention wherein a homopolymer of polyethylene oxide is interposed between the electrodes of opposite polarity to prevent antimony from depositing on the negative electrode and thereby maintaining a relatively high hydrogen overvoltage of that electrode.

Therefore the method of this invention primarily lies in placing a film of a homopolymer of polyethylene oxide between the positive and negative electrodes of a battery prior to charging the battery. It is necessary only that the film of polyethylene oxide be interposed in the electrolyte between the electrodes and therefore it can be placed on the separator between the electrodes, on either electrode, or simply supported on a matrix, such as a screen, between the electrodes. By the method of this invention antimony is prevented from depositing on a negative electrode during charging of the battery. This occurs as a result of the fact that the film of polyethylene oxide becomes a gel in the battery electrolyte and acts as a temporary colloidal trap, confining the antimony until the battery is charged to the potential where gassing occurs. At this point the agitation caused by the gassing disperses the gel which in turn frees the trapped antimony. The negative electrode has been charged to a potential high enough to drive off the antimony as stibine gas, and therefore the antimony does not deposit on the negative electrode.

DESCRIPTION OF THE PREFERRED EMBODIMENTS

The material used in this invention is a high molecular weight film of an alkyl oxide of polymer. In particular, the preferred film used is a homopolymer of polyethylene oxide and is commercially available under the trademark Radel.

The method of this invention is particularly applicable for forming the positive and negative electrodes of a lead acid battery and therefore the discussion will be primarily concerned with using this method during the initial charging of a lead acid battery. For simplicity, much of the discussion will relate to one pair of positive and negative electrodes and is readily applicable to a battery of pairs of electrodes.

In the practice of this invention the film of polyethylene oxide is interposed between the positive and negative electrodes in the battery electrolyte. An easy way of placing this film between the electrodes is to place it on one side of the battery separator by applying slight amounts of heat and pressure. The preferred method is to place the film on the flat side of the separator facing the negative electrode. However, this invention contemplates placing the film on either side of the separator or even placing it on the electrodes. If the film is to be placed on either of the electrodes it is preferred to place it on the negative electrode.

In describing the method of this invention a lead acid battery having a sulphuric acid electrolyte and unformed positive and negative electrodes which are to be initially charged is considered. Thus, in the operation of the method of this invention, a film of the polyethylene oxide may be placed on the back of each separator between each pair of positive and negative electrodes in the battery. Looking at one such pair of electrodes, then upon immersion of the separator in the electrolyte, which normally is sulphuric acid, the film quickly solvates to a voluminous gel which adheres to the separator as long as there is no relative movement of the separator and the electrolyte. Upon movement, the particles of gel disperse and gradually disappear into the sulphuric acid solution. As the electrodes are charged, antimony, which has been set free from the positive electrode, moves toward the negative. However, the polyethylene oxide gel on the back of the separator acts as a colloidal trap for the antimony and prevents it from reaching the negative electrode. As charging of the battery continues and the electrodes are formed, a point is reached wherein gassing commences. At this point, the negative electrode has reached a full state of charge and due to the scrubbing action of the gas, the gel is dissipated, thereby freeing the trapped antimony. However, due to the high charge of the negative electrode which is releasing hydrogen at its surface, the antimony upon arriving at the negative combines with the hydrogen and is driven off in the form of stibine gas.

While one mechanism by which the antimony is removed from the system has been described, it is also believed that since the electrolyte is dumped after the battery is charged, it is possible much of the antimony which had been trapped by the polyethylene oxide gel is removed from the system by the dumping action. However, regardless of the actual reason, the fact remains that by the method of charging the battery with the film of a homopolymer of polyethylene oxide between the battery electrodes, a battery having a charge voltage greater than the conventional battery is achieved.

In the practice of this invention, therefore, by interposing a thin film of a homopolymer of polyethylene oxide in electrolyte between the unformed positive and negative electrodes of a battery, and charging the battery, it is possible to form clear electrodes which are electrodes having no residual lead sulphate on their surfaces at the end of formation. The film need be of no critical thickness, however it should not be so thick as to affect the specific gravity and electrical properties of the electrolyte when it goes into solution. A positive electrode formed in the practice of this invention is significantly hard in texture and there is no loose $PbO_2$ on the surface of the positive electrode, which is generally indicative of exceptionally long cycle life.

As a further point with respect to the clear electrodes formed, it is well known that the rate of self-discharge of the lead acid storage battery is inversely related to the charge voltage when the ohmic resistance of the separator is normal and the negatives are completely formed and clear. With the method of this invention there is achieved an end of formation charge voltage of exceptionally high value, indicative of an extremely low rate of self-discharge. In the following table there are shown the average values of end of charge voltages for three battery cells having different separators between the electrodes. On one separator a 0.003″ film of a homopolymer of polyethylene oxide, commercially available under the trademark Radel, was placed. The first column in the table gives the types of separator used; the second column is the potential difference between the charged positive and negative electrodes which appears as the cell potential; the third column is the potential between the charged positive electrode and a cadmium, reference electrode placed in the cell; and the fourth column is the potential between the charged negative electrode and the cadmium, reference electrode.

| Type of separator | Cell potential (volts) | Positive electrode potential (volts) | Negative electrode potential (volts) |
| --- | --- | --- | --- |
| Paper | 2.62–2.68 | 2.40–2.41 | −.17 to −.23 |
| Microporous rubber | 2.64–2.70 | 2.41 | −.19 to −.25 |
| Microporous rubber and fiberglass | 2.65–2.66 | 2.41 | −.19 to .20 |
| Microporous plastic | 2.64–2.66 | 2.42 | −.20 |
| Microporous plastic with Radel film | 2.80–2.82 | 2.42–2.43 | −.32 to −.36 |

From the table it is apparent that charging a battery according to the teaching of this invention results in a battery having a charged potential significantly higher than batteries which have been charged without interposing the Radel film between the plates of opposite polarity. The significant improvement takes place in the increased potential of the negative electrode as illustrated by the figures in the last column which are the potentials of the negative electrode with respect to a cadmium, reference electrode. Thus by the method of this invention, the negative electrode in lead acid batteries can now be charged to a higher potential which has the overall effect of decreasing the self-discharge of the battery and of providing a battery requiring less maintenance than the conventional battery.

Another way of viewing the effect of having the polyethylene oxide film between the electrodes being charged is to consider what occurs under normal charging conditions. In forming the electrodes for a lead acid storage battery, the unformed positive and negative electrodes are placed in electrolyte in pairs with a suitable separator between each pair of electrodes. As the battery is charged the active material nearest the grid of each electrode is formed first and forming of the active material proceeds from the grid outwards. Initially, the charging voltage is high so as to cause hydrogen to evolve in the area of the negative electrode so that any antimony present in the vicinity of the negative electrode is driven off in the form of stibine gas. However, as charging continues and more active material is formed on both electrodes, the charging voltage is decreased due to the improved conversion efficiency of the active material and eventually reaches a trough value whereat no gassing occurs. During charging, however, antimony is being set free at the positive electrode and is being deposited on the surface of the negative electrode, where is causes the hydrogen overvoltage of the negative electrode to be lowered and causes a local action to occur which results in the formation of lead sulfate on the negative. Therefore, if the hydrogen overvoltage has been lowered sufficiently, the negative electrode no longer is able to accept a charge to form active material since the energy is now being used in evolving hydrogen gas. As a result, the negative electrode, and consequently the battery as a whole, is not charged to as high a potential as would be possible if no antimony had deposited on the negative electrode surface. By the method of this invention, however, the antimony is prevented from reaching the negative electrode until all the active material is formed and charged. Once the negative electrode has achieved this full state of charge, it is able to drive off in the form of stibine gas the antimony which arrives at the electrode after the polyethylene oxide gel has dispersed.

What I claim is:

1. In the method of forming the electrodes in a lead acid battery having at least one positive and one negative electrode and an electrolyte, said electrodes comprising lead active material on grids of lead-antimony alloy, and antimony being removed from said positive electrode and being deposited on said negative electrode during charging of said battery, the improvement comprising interposing between said electrodes in said electrolyte a high molecular weight film of a homopolymer of polyethylene oxide, said film turning into a gel upon immersion in said electrolyte and said gel trapping said antimony and preventing it from reaching said negative electrode until said negative electrode has been substantially completely charged.

2. The method of claim 1 wherein said film is placed on a separator which separates said positive electrode from said negative electrode.

References Cited

UNITED STATES PATENTS

| | | | |
|---|---|---|---|
| 3,208,881 | 9/1965 | Fallon | 136—27 |
| 3,228,796 | 1/1966 | Barak et al. | 136—27 |
| 3,318,794 | 5/1967 | Shinzokiyohara et al. | 136—27 |

WINSTON A. DOUGLAS, Primary Examiner

C. F. LEFEVOUR, Assistant Examiner

U.S. Cl. X.R.

136—76, 157